United States Patent [19]

Slotznick

[11] Patent Number: 5,983,200
[45] Date of Patent: Nov. 9, 1999

[54] INTELLIGENT AGENT FOR EXECUTING DELEGATED TASKS

[76] Inventor: Benjamin Slotznick, 507 Third St., P.O. Box 23, Mt. Gretna, Pa. 17064

[21] Appl. No.: 08/944,923

[22] Filed: Oct. 6, 1997

Related U.S. Application Data

[60] Provisional application No. 60/027,930, Oct. 9, 1996, and provisional application No. 60/031,910, Nov. 22, 1996.

[51] Int. Cl.[6] .................................................. G06F 17/60
[52] U.S. Cl. .................................. 705/26; 705/1; 705/6; 705/27; 705/28; 705/39; 705/40
[58] Field of Search .................................. 705/26, 6, 27, 705/28, 1, 39, 40, 35

[56] References Cited

U.S. PATENT DOCUMENTS

| | | | |
|---|---|---|---|
| 4,418,274 | 11/1983 | Masillo | 235/85 R |
| 4,528,643 | 7/1985 | Freeny, Jr. | 380/4 |
| 4,813,707 | 3/1989 | Habib | 283/2 |
| 4,852,030 | 7/1989 | Munday | 702/178 |
| 5,026,095 | 6/1991 | Hoyeck | 283/2 |
| 5,036,472 | 7/1991 | Buckley et al. | 364/479.03 |
| 5,168,445 | 12/1992 | Kawashima et al. | 705/10 |
| 5,222,052 | 6/1993 | Salame | 368/28 |
| 5,241,464 | 8/1993 | Greulich et al. | 705/26 |
| 5,309,355 | 5/1994 | Lockwood | 705/6 |
| 5,316,342 | 5/1994 | Almo | 283/2 |
| 5,319,542 | 6/1994 | King, Jr. et al. | 705/27 |
| 5,369,570 | 11/1994 | Parad | 705/8 |
| 5,390,281 | 2/1995 | Luciw et al. | 706/11 |
| 5,434,777 | 7/1995 | Luciw | 704/9 |
| 5,452,341 | 9/1995 | Sattar | 379/88.27 |
| 5,473,732 | 12/1995 | Chang | 706/59 |
| 5,477,447 | 12/1995 | Luciw et al. | 704/9 |
| 5,513,117 | 4/1996 | Small | 364/479.03 |
| 5,524,201 | 6/1996 | Shwartz et al. | 345/326 |
| 5,550,746 | 8/1996 | Jacobs | 364/479.01 |
| 5,555,496 | 9/1996 | Tackbary et al. | 705/27 |
| 5,559,714 | 9/1996 | Banks et al. | 364/479.03 |
| 5,586,025 | 12/1996 | Tsuji et al. | 707/500 |
| 5,719,826 | 2/1998 | Lips | 368/29 |

OTHER PUBLICATIONS

International Search Report for PCT/US97/18307, 5 pages.
International Search Report for PCT/US9800628, 2 pages.
Rubenking, N., "Windows Wake–up Call", *PC Magazine*, Nov. 19, 1996, p. 60.
Bernstein, P., "A Personal Information Manager for Lawyers", *Legal Bytes*, May 1994, pp. 35–36.
Commence®: The Workgroup and Personal Information Manager, Commence Corporation (printout from Website www.commence.com/pdatasht.html), 1996, 5 pages.

*Primary Examiner*—Emanuel Todd Voeltz
*Assistant Examiner*—Raquel Alvarez
*Attorney, Agent, or Firm*—Akin, Gump, Strauss, Hauer & Feld, L.L.P.

[57] ABSTRACT

An intelligent agent executes tasks by using intelligent agent learning modules which store information necessary to execute the tasks. A computer receives a command to execute a task or receives data which causes a task request to be generated. The computer accesses appropriate information in the learning modules to execute the task, and outputs instructions for output devices to execute the tasks. The tasks may be executed at a future time and on a periodic basis. The learning modules build up a database of information from previously executed tasks, and the database is used to assist in executing future tasks. The tasks include physical commercial transactions. Portions of the intelligent agent may be remotely located and interconnected via remote communication devices.

20 Claims, 8 Drawing Sheets

Fig. 4

| SEND!    your intelligent agent                                      | ☒ |

| Flowers | Candy | Cards | Fruit | Food |

SEND!™ *Flowers* to [Jim Smith and his wife ▼] for [Anniversary ▼] on [10/27/96]
    Name                    Occasion           Date

| SEND!™ [          ] ▼ for [        ] |
|          Type of Flower       Price  |

Deliver to

[Dr. and Mrs. James D. Smith         ▼]

[589 Walnut Street,
Lebanon, PA, 17042, USA]

---

Pre-programmend dates and unique addresses will be entered automatically.

Dates may be entered using words or numbers for month, day and year. In addition, the words Now, Today, Tomorrow or Next Week, may be used.

A unique home address may be entered in the "Deliver to" section by typing: Residence or Home.

A unique work address may be entered in the "Deliver to" section by typing: Work, Office or Business.

The Last address used for ordering an item for a person may be retrieved in the "Deliver to" section by typing Last Address. (SEND! a second Get Well item to a friend having an extended hospital stay.)

The last address used for ordering for a particular occasion may be retrieved similarly by typing Last Occasion Address. (SEND! a greeting to a client who spends every April in Paris.).

[Exit]

Fig. 6

SEND! your intelligent agent

| Flowers | Candy | Cards | Fruit | Food |

SEND!™ *Flowers* to [Jim Smith and his wife] for [Anniversary] on [10/27/96]
              Name                          Occasion              Date SEND!™ [Pink Carnation Bud Vase ▼] for [    ]
         Type of Flower              Price Deliver to
[Dr. and Mrs. James D. Smith]
[589 Walnut Street,
Lebanon, PA, 17042, USA]

Include Message
*Dear Jim and Lori*
*Happy Anniversary*

*Ben*

You may make changes to the included message, either to the salutation ("Dear Joe"), the body ("Best of Times"), or the closing ("Love JR").

These changes do not permanently change the default message in the program, but they will be called up the next time you send something to this person on this occasion.

Use [XYZ Flowers ▼]
     Merchant

SAVE THIS ORDER
[OK]  [Cancel]

Fig. 7

!SEND! your intelligent agent

| Flowers | Candy | Cards | Fruit | Food |

SEND!™ Flowers to [Jim Smith and his wife] for [Anniversary] on [10/27/96]
　　　　　　　　　　　Name　　　　　　　　　Occasion　　　　　Date

Deliver to
Dr. and Mrs. James D. Smith
589 Walnut Street,
Lebanon, PA, 17042, USA

SEND!™ [Pink Carnation Bud Vase ▼] for [$15.75]
　　　　　　　Type of Flower　　　　　　　　　Price

Add
☑ Deluxe Card　　　$2.00
☐ Balloon
☐ Chocolates
☐ Teddy Bear
☐ Mug with Tea
☑ Crystal Vase　　　$25.50

Include Message
Dear Jim and Lori
Happy Anniversary

Ben

SAVE THIS ORDER
[ OK ]  [ Cancel ]

Shipping　$5.00
Tax　　　 $2.90

Total　$51.15

Use [XYZ Flowers ▼]
　　　　Merchant

INTELLIGENT AGENT FOR EXECUTING DELEGATED TASKS

CROSS-REFERENCE TO RELATED APPLICATIONS

This application claims the benefit of U.S. Provisional Application No. 60/027,930, filed Oct. 9, 1996, entitled "APPARATUS FOR ACCOMPLISHING DELEGATED TASKS", and U.S. Provisional Application No. 60/031,910, filed Nov. 22, 1996, entitled "APPARATUS FOR ACCOMPLISHING DELEGATED TASKS".

BACKGROUND OF THE INVENTION

The present invention relates to a system which serves as an intelligent agent, expedites electronically placed orders, purchases, deliveries or production instructions for a variety of goods and services, and carries out various delegated tasks, in the present or the future or repeatedly over time.

The key achievement and central paradigm of the personal computer industry has been empowering the end user, such as an office worker, to directly manipulate data (including text, sound and images) today, here and now. Now, individuals can effectively and quickly accomplish tasks that previously had to be delegated to others. For example, word processing is no longer the sole province of secretaries, graphic design (including illustration, presentation graphics, chart preparation and desktop publishing) is no longer relegated to graphic artists and art departments, and fiscal projections (since the advent of spreadsheets and relational databases) are no longer monopolized by planning and accounting departments. The paradigm has been that when armed with a personal computer, in the time it takes to assign a task, explain it, review it and correct it, the task can be done by oneself. In the process, the individual can review more data and more options enabling more informed choices with respect to the task at hand.

The paradigm can be seen at work, for example, in the greeting card industry. Evidence the computer software programs that allow users to choose or create professional quality greeting cards on a home printer, or at a stand-alone kiosk in a shopping mall, or on-line via the Internet or proprietary services such as CompuServe. Hallmark Cards, Inc. of Kansas City, Mo. and American Greetings Corp. both have had stand alone electronic kiosks, computer software programs for at-home card creation and on-line catalogues of greeting cards. In addition, U.S. Pat. No. 5,513,117 issued to Small, incorporated herein by reference, discloses an apparatus and method for electronically dispensing personalized greeting cards and gifts.

The paradigm of contemporaneous access to and manipulation of data is also embodied in U.S. Pat. No. 4,528,643 issued to Freeny, Jr., incorporated herein by reference, that discloses a system for reproducing information in material objects at a point of sale. For example, a book, greeting card, or music CD is produced in a vending machine when a purchaser puts in money. Stored, digitized information (text, graphics, sound or video) is placed on a blank medium (paper, disc, tape, etc.) at the point of sale when the device is activated. The stored information need not be stored at the point of sale. The device in Freeny, Jr. (unlike the device in Small) does not encompass personalizing the material object, and does not seem to encompass manufacturing the item at a place different from the point of sale for shipping elsewhere.

The paradigm extends to other industries and markets for products, services and entertainments as well. Both American Airlines (via its Sabre system) and United Airlines have on-line computerized airline reservation systems, and a variety of airlines have ticket dispensing kiosks. Florists have also used kiosks and on-line "flower shops" to allow users to order flowers for delivery via wire services such as FTD. Even Domino's Pizza has a site on the Internet's World Wide Web for on-line ordering of pizza.

What these devices and methods have in common is that (1) the user must choose from myriad options, (2) the user must enter significant amounts of data (whether by keyboard "type and tab", mouse or trackball "point and click", or voice activated menu-driven selection systems), (3) the user must pay for the product at the time of ordering (as with a kiosk or on-line catalogue) or prior thereto (as with software for at home production of greeting cards), and (4) the product or service is generally "dispensed" or shipped at the time it is ordered and the user is using or otherwise "logged on" to the device.

To accomplish future purchase and delivery of goods or services, a user must remind himself or herself to do it later, requiring either a good memory, a written reminder list, or the ubiquitous "remind me" metaphor of the "to do" lists of electronic and computer organizers. As exceptions to this general practice, some flower and greeting card services accept present payment for the promise of a future delivery, some electronic checking systems have arrangements for future or periodic electronic transfer of funds, and some communication software allows scheduling future transmission of fax or E-mail messages.

Using the devices discussed above can be time consuming. To order flowers over the Internet, for example, may take thirty or forty minutes, whereas ordering the same flowers over the telephone through an FTD florist with a human salesperson takes less than five minutes.

Intelligent agents, such as those of Internet companies Firefly and Amazon Books, have been used to make suggestions about which products a user might like, and thus may reduce the list of choices a user must consider, but the suggestions are not self-executing as contemplated herein.

Despite the power of the "direct manipulation of data" paradigm for tasks such as word processing, the truth is that it is not appropriate for all tasks. One person cannot do everything. A person can be at only one place at a time, and time itself is limited. In contrast, the precept of industrial organization and automation is that a person can accomplish much more if he or she delegates some tasks to other people or machines.

The device disclosed herein acts like a good executive assistant. The user can quickly delegate tasks to be accomplished (with little or no additional input) either now or in the future (even repeatedly and periodically).

Using the present invention, both payment and delivery can be specified for future occurrence. In addition, the present invention incorporates a learning database that accumulates data on an incremental as-needed basis. The present invention learns terms which it didn't originally know (such as nicknames, shipping addresses, alternate product names, and user's preferences over products) but only requires the data needed for the current task. The present invention remembers the data (like a good executive assistant) as a way to expedite the delegation process of the present task and similar tasks in the future.

In short, the apparatus described herein can accomplish action at a distance in both time and space and arrange payment at a distance in time. By acting as an intelligent agent with a learning database, the device uses simple natural language commands to accomplish complex actions. Because it can accomplish these tasks through written, visual, pointing device, graphic and/or verbal commands, the apparatus is accessible for the disabled, for those for whom English is a second language and for those with no knowledge of English.

The invention disclosed herein also teaches a system for reproducing information itself or in material objects, here and now, or in the future, at a point of sale, or when the information originates either at the point of sale, or at a different place or at a different time or times. In addition, the invention teaches a system for purchaser input to personalize the product or otherwise assist in creation of the product. In addition, the present invention teaches a method of manufacturing other types of material objects that are not the reproduction of information, at point of sale, or at a distance in time and place. In addition, the present invention teaches a method of reproducing such information when the information (or part of it) originates (or is developed) over time from a user's input, in that the learning database accumulates information from time to time and over time. The accumulated information is embodied in or modifies the production or shipping of the manufactured material object. In addition, the present invention teaches a method and system by which such material objects can be ordered using natural language. The present invention also teaches a system for reproducing information with respect to services and intangibles in addition to material objects.

The present invention not only reminds a user about a task or event, but accomplishes that task without further user intervention. The present invention also has the option of requiring the user to confirm a scheduled task just prior to the automated execution of the task or requiring the device to send confirmation of execution after completion of the task, as well as interim "progress reports" during the execution of a task that takes place over time.

The apparatus described herein introduces and supports a robust new paradigm for personal computing and other computerized or computer-aided devices: allowing end users to delegate tasks for automatically scheduled execution, now, in the future and periodically. The "remind me" metaphor of "to do" lists is replaced when appropriate by a "delegate to the computer" metaphor of "do it" lists.

Many important jobs are put off or forgotten because they might take too long and, though important, have lower priority than other tasks at hand. This includes gathering and entering data into databases. The device described herein not only speeds the delegation and execution of many tasks, but incrementally accumulates useful data that might otherwise be lost.

As noted above, the present invention relates to a system which serves as an intelligent agent, expedites electronically placed orders, purchases, deliveries or production instructions for a variety of goods and services, and carries out various delegated tasks, in the present or the future or repeatedly over time. The instructions to the device may be issued using natural language commands (typed, clicked or spoken). Four examples of instructions issued with natural language commands are as follows:

(1) "Send flowers to Jim Smith and his wife on their anniversary."
(2) "Ship piston-rings to Osaka Motors by next Tuesday."
(3) "Make airplane reservations to Cairo for Easter weekend."
(4) "Plan dinner for six with a fish entree and pasta side dish, and limit the salt and cholesterol."

In the first example, by way of illustration, the apparatus or device learns to associate the phrase "Jim Smith and his wife" with a given name such as "James D. Smith" and the more proper "Dr. and Mrs. James D. Smith." It learns to associate that given name with a variety of occasions, dates and shipping addresses. It can also learn the user's preferences for gift items such as flowers (e.g., price range per occasion). The apparatus knows how much lead time is needed to ship the product to ensure delivery on the specified date.

Every day the apparatus examines which orders must be executed to ensure "just in time" delivery of the required products and services. Then, it electronically orders, purchases, arranges payment for, and/or dispenses the required items. In addition, it may look up orders from previous years (or time cycles) and ask the user if he or she wants to repeat the order in the current year (or time cycle). On the day the apparatus is to execute the order, and prior to execution, payment may be accepted (after automatic electronic verification) by pre-entered credit card account, business account or electronic currency. Prepayment is also possible (including by smart card or coins in a vending machine), but not necessary.

The second example illustrates that delegated tasks need not be limited to purchase orders. In addition, it shows that specifying future delivery need not be a specific date but a calculated one. A similar command could require shipment of piston-rings every Tuesday, requiring repeated automated calculations and transmissions. In addition, the example illustrates other learning situations. Here, the device can learn what type of piston rings are used by Osaka Motors, what quantity is usually shipped, how it is shipped (based partly on the required delivery date) and the requisite part numbers to affix to invoices.

Some embodiments of the device may be able to accept contingent instructions such as "Send piston-rings to Osaka Motors when inventory drops below 100 cases." In this case, inventory levels are obtained by other automated systems or devices, such as bar code readers (e.g., at point-of-sale or warehouse loading docks), or volume or weight sensors. Instructions may contain both contingent criteria and time and date calculations, such as "Send piston-rings to Osaka Motors every Tuesday to maintain inventory levels at 500 cases." The criteria may be based upon mathematical calculations or projections that in turn are based upon data gathered manually or automatically. For example "Send piston-rings to Osaka Motors every Tuesday to maintain inventory at 100 cases above their projected sales," where the projected sales figures are manually or automatically calculated from shipping data obtained manually or automatically from the warehouses or sales offices of Osaka Motors or point-of-sale devices for Osaka motors, which may be located in various places. The examples above illustrate how the device may be activated by other automated or semi-automated devices or software.

This example shows how in those embodiments in which the invention maintains an open architecture, the embodiment can be linked to or embedded in other devices or software, and "called" by these other devices as if the invention were a module, function, subroutine or procedure. In such embodiments, the invention can even augment the performance and provide new functional capabilities when coupled with various off-the-shelf software, including spreadsheets, relational databases, and contact managers.

The third example illustrates a future event (e.g., Easter) which cannot be directly calculated from the standard Gregorian calendar, but must be determined by other ways. In addition, the third example illustrates other learning situations: here the device can learn that the user always means Cairo, Ill., not Cairo, Egypt, and can learn what type of seating arrangements (first class versus economy, window versus aisle) the user prefers.

Consider a variation of the third example, "Make travel arrangements to Cairo for Easter weekend." This illustrates how a delegated task may consist of performing and coordinating a number of related tasks. For example, making travel arrangements entails not only ordering airplane tickets, but also making hotel reservations, arranging car rentals, reserving meeting rooms, choosing restaurants (and making reservations for them), and arranging for sightseeing tours and entertainment (including purchasing theater or concert tickets). When requested, the apparatus also makes arrangements for traveling companions (whether business or family). To accomplish portions of this task (such as choosing entertainment or a restaurant), the device may have to query the user on current preferences in the same manner that an executive assistant would ask what kind of food you are in the mood for. In fact, when the task of ordering airplane tickets is given to the device, it may query the user about the need for hotel accommodations, car rentals, and the like.

The first three examples illustrate embodiments of the invention in which information such as addresses and birthdays are downloaded from (or posted to and saved in) the user's existing contact manager software. The third example illustrates an embodiment in which information such as the dates of a conference or business trip as well as traveling companions or participants at the planned out-of-town meetings are downloaded from (or posted to and saved in) the user's existing scheduler or organizer software. In addition, posting an out-of-town meeting on the user's scheduling software triggers a query from the device as to whether the user wishes to make travel arrangements. Similarly, posting a person's birthday or anniversary on the contact manager software triggers a query from the device as to whether the user wishes to schedule the device to order a greeting card or gift.

When products or services are ordered, the transaction amount is automatically posted to the user's electronic accounting software (including electronic checking accounts such as Intuit's Quicken or Microsoft's Money, or customized programs including those using spreadsheets or relational databases). When the user employs the device to automatically ship goods or services, the transaction amount is automatically entered into accounts payable. A transaction which involves ordering a tangible product which requires payment may be referred to as a "physical commercial transaction."

The above examples have focused on user originated tasks, but many tasks are undertaken in response to queries, solicitations or directives from others. Such tasks may also be streamlined and delegated using the invention when the queries conform to the device's specifications and architecture.

For example, many political groups send mail to supporters asking the supporters to send donations or to write letters to their political representatives. When the apparatus described herein receives electronic mail such as, "Please sign a copy of the enclosed letter and mail it to your Congressman," the user need only tell the apparatus "OK" (for example, by clicking an on-screen button labeled "OK"). At that time, the apparatus will automatically insert the appropriate Congressman's name and address, affix a digitized version of the user's signature and electronically re-transmit the completed letter to a re-mailer such as the Internet company OutPost which will print the letter, place it into an envelope, attach a stamp and place it in the U.S. Mail. (Alternatively, the user could edit the proposed letter on-screen before clicking "OK".) The apparatus can also generate and mail follow up letters every week. The user can instruct the device to automatically "OK" any such request from his or her favored groups. The apparatus can just as easily (and just as automatically) send a contribution using various credit card or electronic payment schemes.

A more commercial application would use electronic mail to broadcast the daily obituaries. The invention would compare the names of the recently deceased with the user's contact list to inform him or her if any clients (or their relatives) had died, and ask whether flowers or a sympathy card should be sent, e.g., "The mother of Joe Smith, your client, just died, would you like to sent flowers to the funeral?" If the user tells the apparatus "OK," it will automatically send an order to a florist for sympathy flowers (the kind and price previously ordered by the user) to be delivered to the funeral home specified in the electronic obituary. The user is not limited to a response of "OK" but can instead choose to send different flowers, or to send a special message with the flowers. Again, the user can instruct the apparatus to automatically respond "OK" for pre-selected "top" clients.

In these delegated "response tasks", the apparatus acts as an executive assistant who opens the mail, asks the boss whether a reply is appropriate, and then composes and sends the reply. Thus, a response task is initiated as a result of a query automatically received by the apparatus.

The apparatus is not limited to user originated tasks, or response tasks. The device may be delegated tasks which involve interactions (including automated querying, response, re-querying, and other feedback) among several components of the apparatus. This is like an executive assistant who is given a task, but must find out certain information from others before the task can be executed. Examples of such tasks include delegating scheduling of a doctor's appointment, or scheduling a meeting among individuals who use different scheduling software. (Current electronic schedulers can service individuals within a work group on one network with the same software, but do not provide this service in a cross-platform manner or between networks.)

Another application with such interactions involves broadcast and point-cast media, such as radio, television, or broadcasts or point-casts over the Internet. When a user hears a tune on the radio that he or she likes, the user presses the "SEND" button on the remote control and the audio CD is automatically ordered. Of course, if the CD is to be a gift, the user must enter the recipient's name and occasion to establish a shipping address and shipping date. When a user hears or sees an advertisement over broadcast or point-cast media, and wants to order the product, the user again presses the "SEND" button on the remote control and the product is automatically ordered. Again, gift items require additional choices. When a user watches a video over the Internet, whether a music video or a situation comedy, clicking on the image of an actor will allow the user to order the clothes, jewelry, and other articles that the actor is wearing. (The device already knows the user's size, although the size of gift items must be entered.) Clicking on an object on the screen, such as furniture, an appliance or a painting, allows the user to order that item. For the examples in this paragraph, the broadcast includes purchasing information (not shown on the screen) and the device uses that information along with information it has previously stored (such as the user's credit card number and shipping address) to compose and transmit a purchase order.

The fourth example illustrates an interactive embodiment of the invention which plans and helps cook meals; "Plan dinner for six with a fish entree and pasta side dish, and limit the salt and cholesterol." The device first acts as an expert system (e.g., a famous chef such as Julia Childs) to help plan the menus for one meal or a week of meals. The device may query the user to establish constraints (e.g., "Do you want spicy or mild?" "How long do you have to prepare the meal?" "How long do you have to eat the meal?") After establishing a menu, the device prepares a list of ingredients, altering recipes using previously entered data to accommodate the user's special tastes, dietary restrictions and the number of family members (and planned-for guests). The device also keeps a running inventory of food in the user's refrigerator and pantry. The device then compares the ingredients list and the inventory list and prepares a shopping list for needed ingredients. The shopping list is automatically and electronically sent to the grocery for regularly (or specially) scheduled delivery. The device may also have an inventory of the user's cooking appliances and pots and pans. When the meal is to be cooked, the device internally prepares a critical path method using appropriate cookware and appliances to ensure that all the food is done at the appropriate times and in the most efficient manner. The device tells the user (onscreen or via speech synthesis) what ingredients to take out of the refrigerator or panty, and when, the order in which to cook items and how long to cook each item. If the device is embodied with a screen monitor in the user's kitchen area, the screen may display video demonstrations of special cooking techniques at the appropriate time (e.g., correct sauteing or basting techniques). If guests are to be invited, the device can send out invitations when the meal is first being planned. Similar embodiments help plan and carry out home improvement projects (e.g., building a deck or fixing a faucet).

The apparatus can share both its learned and preprogrammed database with other computer software such as schedulers and contact managers.

With the apparatus a user can order not only flowers, but all goods, services or entertainments which can be ordered or dispensed electronically. The user is able to delegate tasks that occur not only just now but also in the future or on a periodic or repetitive basis. Payment for executing the command and providing the requested goods, services or entertainments need not be made when the command is initially entered, but rather may be postponed automatically until the task is executed. The apparatus incorporates an intelligent database that learns new facts (such as shipping addresses) on an incremental and "as needed" basis, and then remembers and utilizes that knowledge in executing future commands. Calculation of periodicity is not limited to the Gregorian calendar but includes other ethnic calendars (such as Chinese, Jewish, Islamic or Hindu), Christian moveable feasts (such Easter) and natural cycles (e.g., lunar or tidal).

The periodicities may be conventional or non-conventional, even when using the same calendar, such as the Gregorian calendar. For example, a conventional periodicity may be "the first Monday of each month." An example of a non-conventional periodicity may be the calculation of Election Day, which is "the first Tuesday after the first Monday in November." Other holidays or events may be related to more than one periodicity. Easter (as celebrated in the Catholic Church) is related to both the solar year and the lunar year; Easter is related to the first Sunday after the first new moon, after the Spring Equinox. Conventional calendaring and scheduling programs do not have the capability of automatically calculating such non-conventional periodicities.

The apparatus may be embodied as a stand-alone kiosk, as a kiosk connected to one or more remote devices, as a network of connected devices such as (but not limited to) computers, workstations, telephones, printers and/or fax machines. The apparatus may be embodied in other ways as well. The connections may be via one or more of (but not limited to) the following: telephone wires, cable TV wires, wireless communications (including cellular, mobile phone and satellite communications) and other electronic networks including but not limited to the Internet. Payment may be by cash (coins or bills), especially if the apparatus is embodied as a kiosk or if input to the apparatus is from a pay phone, via credit or debit card, prepaid card or business/personal account, or other electronic currency or payment scheme.

BRIEF SUMMARY OF THE INVENTION

The present invention is an intelligent agent for executing tasks. The intelligent agent comprises at least one data input device for entering tasks to be executed, at least one intelligent agent learning module for storing information necessary to execute the tasks, a computer connected to the at least one data input device and to the at least one learning module, and at least one output device connected to the computer. The computer receives the entered tasks and learning module information relevant to the tasks, processes the information, and generates instructions for executing the tasks. The at least one output device executes the tasks. Data input devices, learning modules, the computer and output devices may be located remote from each other. The learning module builds up a database of information based upon previously executed tasks, and the database may be used to execute a currently requested task.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is an illustration of a representative menu for a personal computer or interactive television for ordering products and services or delegating tasks in accordance with a remote device of FIG. 3;

FIG. 6 is an illustration of a representative second screen on the representative menu of FIG. 4;

FIG. 7 is an illustration of a representative third screen on the representative menu of FIG. 4.

DETAILED DESCRIPTION OF THE INVENTION

Figure 1:
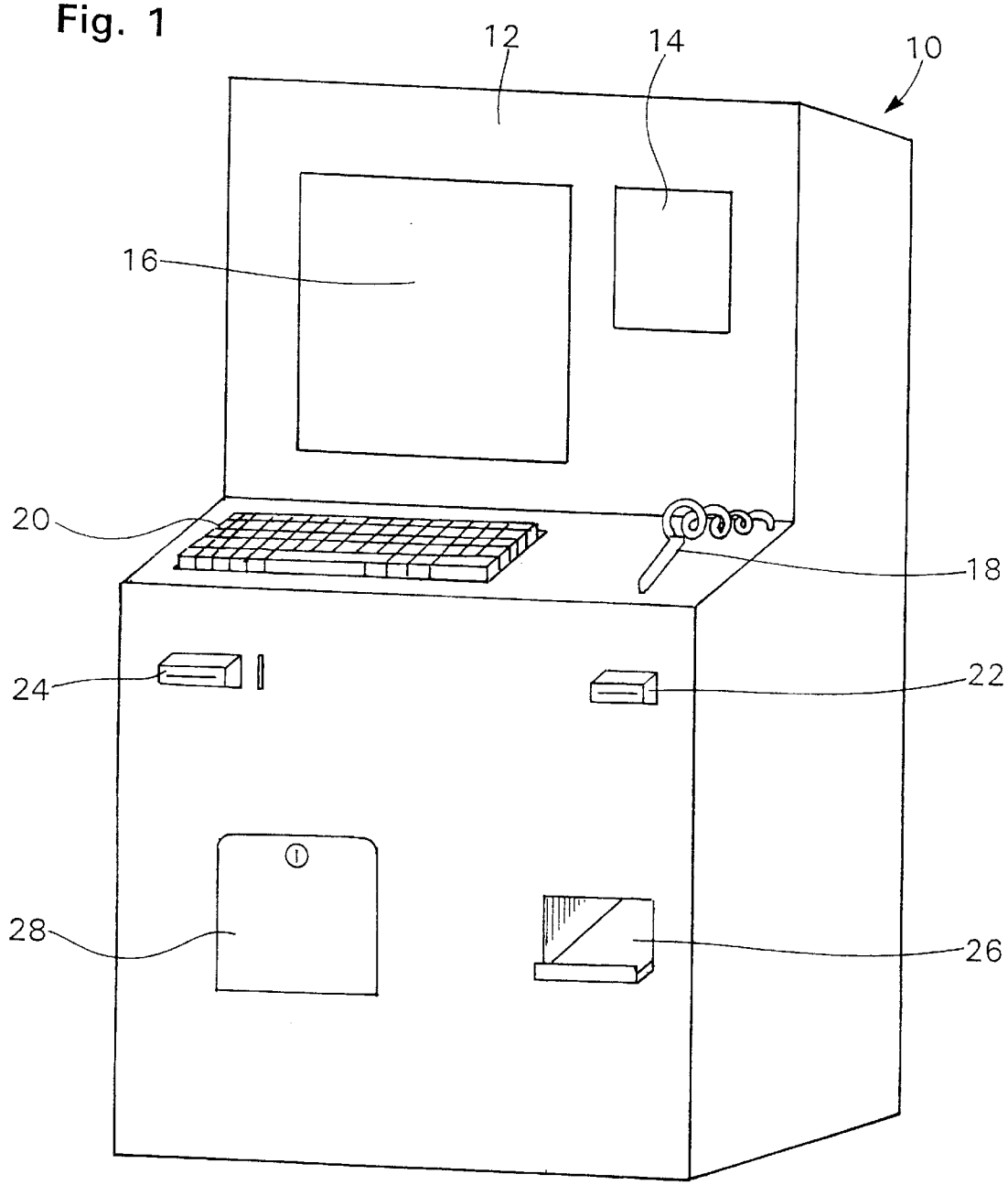
FIG. 1 is a perspective view of a stand-alone electronic apparatus for dispensing personalized greeting cards and gifts, in accordance with a first embodiment of the present invention.

Certain terminology is used herein for convenience only and is not to be taken as a limitation on the present invention. In the drawings, the same reference numerals are employed for designating the same elements throughout the several figures.

DEFINITIONS

The below described apparatus in accordance with the present invention is a stand-alone or interconnected device with electronic components for accomplishing various tasks delegated to the device, through one or more output devices, now or in the future or periodically, at times through "natural language" commands and at times aided by intelligent agents and/or expert systems.

The following definitions are provided to promote understanding of the invention:

In this document, the term "periodically", means that a task is executed more than one time, including being repeatedly executed at regular intervals of time (such as the first day of every month, or every Tuesday, or at a specified date once a year), regardless of the time cycle or calendar used and including being executed repeatedly at irregular intervals or indeterminate intervals. The term includes instances where the repetitions are many, where the repetitions are few, and where there is only one repetition. The term includes situations in which the number of repetitions is known at the outset, instances where the number of repetitions is not or cannot be predetermined, and instances in which there could theoretically be an infinite number of repetitions (e.g., delegating the task of sending someone a Christmas wreath every year could theoretically occur forever, but such a standing order would in fact be canceled within a finite time). The term includes instances in which the criteria determining the repetition is well defined, random, or on a contingent or "as needed" basis. Repetitions may be triggered by timing and dating devices as well as other automated sensors, such as bar code readers, photoelectric cells, distance or weight sensing devices, proximity detectors or any device used to detect and or record data, whether or not incorporated into point of sale devices or other inventory control apparatus. For example, various equipment may be used to record commodity or inventory levels. When the commodity or inventory levels fall below a predetermined point, the equipment sends a signal to the device of the present invention to transmit an order to replenish the commodity, or to execute some other action or non-action or change of action. Sensed data may be recorded with a variety of automatic devices including (but not limited to) analog and digital computers, and these recording devices may aggregate the data or use the data for computations or projections (whether of units or profits, etc.) using various hardware and or various mathematical methodologies. These methodologies may impose certain criteria (e.g., logical, statistical, mathematical, electrical) which when satisfied (or not satisfied) cause that device to send a signal which causes the device of the present invention to execute some action or non-action or change of action. Examples of control input include electronic data interchange information and transmittals. Such automatically generated instructions may require confirmation by the user or may proceed to execution without confirmation, or may require post-execution acknowledgment to the user by the device that automated action was taken. The device may use a rule system to combine both the automatically generated instructions and date or time based calculations of periodicity as well as user input. For example, the device may transmit an order on the first of each month, but the amount of the order, and the items ordered are based upon a combination of inventory sensing equipment and computer based sales projections along with user overrides.

In this document, the term "stand-alone device" refers to devices including (but not limited to) vending machines and kiosks which create, alter or dispense a physical product or combination of physical products such as, but not limited to, greeting cards, prepaid telephone calling cards, gift certificates, trading cards, printed material of monetary value (including but not limited to money orders, bearer notes, bonds and certificates of deposit), lottery tickets (where legal), coins and currency, or microchip (with sound clips including voice greetings, or image clips including video of still or moving images) and which then dispense it directly. The term also covers devices which personalize products by way of automated engraving or pressing (e.g., for brass or metal items), automated sewing (e.g., for monogrammed polo shirts) and printing on other media (e.g., stickers, decals or iron-on transfer paper). The term also covers devices in which the product is dispensed to a common carrier such as Federal Express or the U.S. Post Office for delivery. In addition, the term includes vending machines or kiosks which create, alter or dispense an electronically encoded product or combination of products (such as a bit-mapped image file, sound file or text file), electronic currency, electronic gift certificates or electronic versions of the physical objects mentioned in the first sentence under "stand-alone device" for transmission directly to a receiving device owned or used by the person the purchaser intends to receive the product, including but not limited to fax machines, printers, television sets and computers. In addition, the term includes vending machines or kiosks which physically dispense or electronically transmit instructions or keys (including but not limited to PIN numbers) to access on-line products, services, messages, currency or entertainment. In addition, the term includes vending machines or kiosks which create, alter or dispense a combination of any products or product types including, but not limited to, the products and product types mentioned above. The term also includes both devices which accept payment (including but not limited to cash, credit cards, debt cards or smart cards) and devices which do not themselves accept payment but require payment to be made to a clerk at a nearby sales counter. The term also includes a device which requires a clerk at a nearby sales counter to authorize the transaction via a simple switching device. A stand alone device may include a credit card reader and verifier, cash receiving equipment, an alphanumeric keyboard, one or more video screens, a voice synthesizer, a color printer printing on blank or partially printed card stock as well as gift table memory and encoder. Input devices include alphanumeric keypads, numeric keypads, pointing devices (including but not limited to track balls, mouse pointers, and touch pads), touch screens, handwriting input pressure pads or light pens, various digitizer pads, scanners (including those for graphics, text and handwriting), optical character recognition modules, handwriting recognition modules and voice recognition modules. The handwriting input pressure pads may be used as part of credit card verification, or as input for adding signatures or handwritten message to the product which can be personalized via the other input methods. The scanner may be used for adding signatures, graphics or messages to the product, as well.

The term "stand-alone" device also refers to devices which automatically send orders or requests or data to third parties for processing, such as flower-ordering kiosks directly connected to a dispensing florist or the FTD wire-network, regardless of the manner of sending the orders, requests or data. The essence of this type of standalone device is automated taking of the order and automatic calculation of the time to ship the order, followed by automatic notification to the third party of the order and delivery date at an appropriate time to insure "just in time" delivery of the item.

The term "interconnected device" refers to devices which perform the same functions as the aforementioned stand-alone device, but which distribute the physical and electronic components among two or more locations and connect those components so that electronically encoded data can pass between and among them. The connection may be via wire, conduit or other substance through which electrical signals can pass, fiber-optic cables or other material through which light waves or other electromagnetic radiation can pass, via air or vacuum through which radio or other electromagnetic waves can pass. The connection includes any combination of the above, as well. An example of an interconnected device is a device similar to the stand-alone device, but with an essential component located at a nearby counter with a salesclerk. The essential component might be the credit card verifier, the printer, or a second keyboard for debugging, entering essential information or editing the personalized products. Similarly, several otherwise stand-alone devices located in one department store or shopping mall might share a single printer, a single modem for transmitting and dispensing electronic items, or a single central processing unit. The term includes systems in which the central processing unit is not located in one place but rather distributed, where input is distributed, and where memory and data storage may be separate from the computational components (which themselves may be centrally located, located at various central places or distributed). In other words, parts of the computations may be performed at different locations and parts of data may be stored at different locations. Computation and memory systems may include but need not include redundancies. The term interconnected device includes both hardwired components, and networked systems of components. The term includes but is not limited to systems of mainframes connected to dumb or smart terminals, personal computers or workstations, systems of client/servers connected to personal computers and workstations, and mixtures of such systems. The term interconnected device includes distributing the components over a network of networks such as the Internet. The term includes on-line computer access, interactive television access, and telephone access, where the input is through components (including but not limited to personal computers, interactive televisions, telephones, pagers, electronic organizers, electronic Rolodexes, personal digital assistants, ATM money machines, fax machines, scanners, and handwriting input devices) owned by various parties and possibly used for other purposes which may not be covered by the present invention. This term applies regardless of which part of the creation, recollection, or dispensing of the product is distributed. As such, the term interconnected device includes software and/or hardware which enables a personal computer, interactive television or telephone or other home or office machine or appliance to become part of an interconnected device for the purposes contained herein or enable such machines to simulate the workings of a stand-alone device or an interconnected device for the purposes contained herein. The term also includes software regardless of how distributed, and whether hardwired into the machine, hard coded into its operating system, written to hard disk or permanent memory, or into temporary storage (including but not limited to CD-ROM and floppy disk), or temporarily residing in the machine via a Java-type applet downloaded from a server or off a network such as the Internet.

The term "interconnected device" includes software and/or hardware which enables a user, a sensing device, computer (or other) hardware, or software to delegate a command to or transmit an instruction to, or otherwise trigger an action by an interconnected device or an object which simulates the workings and/or actions of an interconnected device, even though owned by various parties and possibly used for other purposes which may not be covered by the present invention. For example, to the extent that off-the-shelf software such as (but not limited to) relational databases or spreadsheets trigger an interconnected device or delegate a task to an interconnected device, or embed or link an apparatus with another program, or call a function, module, procedure, or subroutine. which acts as an interconnected device, or itself triggers or delegates a task to or embeds or links an apparatus with an interconnected device, the off-the-shelf software during such triggering, delegating, embedding or calling is part of an interconnected device, even though for other purposes the off-the-shelf software might not be covered under the present invention. An interconnected device includes a device which connects to more than one interconnected devices. The term interconnected device includes the situation when two or more interconnected devices link or communicate with one another, including ascertaining tasks, breaking them up into smaller parts, and distributing the partial tasks between or among the interconnected devices in forms of inter-device task delegation and also including situations in which the several interconnected devices must provide each other with information on a one time, repeated or on-going basis in order to accomplish the complete task or its partial components.

The terms "stand-alone device" and "interconnected device" include both when the services and products are sold as well as when they are given away or exchanged for value. The terms apply whether payment is cash, smart card, electronic cash, cash equivalent, credit card, debit card, other credit or debit account or arrangement, or exchange for some other thing of value or no value.

The term "task" refers to purchasing, ordering, creating, altering, personalizing, dispensing, or distributing a product or service or entertainment or other things of value, whether tangible or intangible, whether physical or computer code, or encoded data. The term also includes issuing or expediting purchasing, shipping or production orders, or other task amenable to electronic data interchange and any other task, job, or assignment which can be electronically automated by delegating to a stand-alone or interconnected device using an intelligent agent, including delegation via natural language commands as delineated or illustrated in this patent application.

The term "task" also refers to reserving or otherwise making reservations for products, services, entertainment or combinations thereof, or otherwise ensuring the availability of the products, services or entertainment, with or without payment for such reservations, and with or without payment (full or partial) for such products, services or entertainment. For example, this includes not only hotel and restaurant reservations, and airplane ticket reservations, but also an electronic version of retail "layaway" plans for goods and services. The term task includes providing planning and logistics for interconnected and more complicated tasks involving a variety of vendors or services, for example ordering everything for a business trip which might include, plane tickets, car rental, hotel accommodations and a dinner party. The device may obtain crucial event specifications or scheduling issues from memory or current input and then delegate these interrelated tasks to linked or embedded interconnected devices with sufficient feedback loops between the modules to ensure compliance with specifications. The term "task" is meant to include all the various forms of scheduling or tracking of appointments, meetings or other tasks or scheduling data entries used for those appointments, meetings or other tasks.

The term "natural language command" means a command or request which is understood by the device and could occur in spoken conversation between two people: one person and a subordinate to whom a task is being delegated. The recognized commands depend upon the task at hand and a particular device might recognize only one "sentence" or syntax of command appropriate to the tasks it has been designed to accomplish. The term includes not only commands given in English, but in any other language, whether spoken, mouthed, written, signed (including sign-language for the deaf), or visualized. Both stand-alone devices and interconnected devices may, but need not, use natural language commands.

The term "intelligent agent" means a device, or method which enables a device, to simulate the knowledge base or problem solving abilities of a human executive assistant or agent. The term includes databases (whether or not incrementally gathered) which "learn" relationships, substitutes, nicknames, user preferences, personal euphemisms, and the like. As an example, the device can be taught that the phrase "Bill and Patti" refers to "Mr. and Mrs. William Jones, III" and that they have a particular address, or phone number, with particular likes and dislikes, etc. so that when the user inputs "Bill and Patti" the device can supply other additional essential information necessary for the task at hand. The term intelligent agent includes databases which generate a profile of user preferences by interactive questioning, by recording a history of the user's actual choices, or by some other means or combination of means. The term includes databases which use such profiles to create inference ranking rules that would suggest which choices an individual most prefers or which alternatives an individual might prefer (even if not yet faced with that choice). The term includes programs or methods based upon relationships and likenesses among possible choices, as well as rankings determined by polling like-minded or similarly preferenced individual (such as but not limited to the Firefly system on the Internet, by which individuals list favorite records or books, the program groups individuals with similar likes, and then infers that other records or books enjoyed by an individual would be enjoyed by similar individuals even if the similar individual had not listed the records or books). The term also includes programs which search out information, data, products, merchants, services, and the like. which meet pre-specified criteria. For example, an intelligent agent could search for the best price for a particular product, the best quality among similar products (according to some ranking organization such as Consumer Reports), or the "best" ratio of price to quality (according to some rule or rules, ranking organization such as Consumer Reports, or even expert system as defined below). As further example, an intelligent agent could search for the "biggest" rose, or the "shortest" layover time in an airplane flight schedule. The criteria might be generated by internal rules, specified by the user, or inferred from prior user choices. The term intelligent agent refers to a device or software which accomplishes one or more of the above or similar operations.

The term "expert system" means a device or program which enables a device to simulate the knowledge base or problem solving abilities of a human expert in a particular field or fields. The term includes programs which either mimic or attempt to simulate the decision tree and choice rules which an expert uses to diagnose a problem (such as a doctor diagnosing an illness or an auto mechanic analyzing the source of a mechanical problem in a car engine), propose solutions to the problem (such as a doctor writing prescriptions for a patient's illness that do not create bad reactions with the patient's other prescriptions), find relevant information from extended or extensive databases, or otherwise apply rule based systems of logic and inference to problem solving (or problem defining) activities. The term includes both systems designed for well defined problems, as well as those designed for amorphous situations. The term includes both systems relying on "hard and fast" rules as well as those incorporating "fuzzy" logic or probabilistic decision analysis. In addition the term includes both systems incorporating deductive reasoning from known premises, and inductive reasoning from observations (such as but not limited to the use of Bayesian estimators). The term includes all such rule based systems regardless of the mathematical methodology or logical structure used to develop or implement the rules. In the context of gift giving, expert systems can simulate the advice of Amy Vanderbilt or Martha Stewart on the properness, appropriateness or good taste of a particular gift. The human counterpart exists in high-end department stores such as Nordstrom's which offer customers the service of "personal buyers" to help select merchandise for the customer. In the particular context of sending flowers or plants, an expert system can advise which plants grow best in the intended recipient's place of residence as well as on issues of etiquette. For example, the expert system might inform a user that a wreath is not an appropriate gift to give to a Jewish family because wreaths have become a Christian symbol signifying the resurrection of Jesus. The term "expert system" applies both to a program or device actively called upon by the user for advice, as well as a program which offers unsolicited advice (such as error messages). In addition, the term applies both to a program which gives "advice" as well as one which works in the background, helping choose, categorize or rank options.

In this document, the term "output device" refers to a device for executing a task. The output device may be a physical device, such as a product dispenser or a device which makes a product, or the output device may be an electronic or virtual device, such as a modem or display screen which communicates tasks to be executed to a service provider. To further explain the electronic or virtual output device, consider, for example, the task of ordering flowers. The output device becomes the medium (or media) which provides the instructions to the florist shop that is designated to prepare the order, and may include a modem, a printer or a screen display. The output device may also be a device connector which interconnects a plurality of devices which are required to perform the requested task.

DETAILED DESCRIPTION

Referring to FIG. 1, the numeral 10 generally refers to an apparatus for dispensing products or ordering products and services, for present or future implementation. A video display 12 may include a pair of display screens 14 and 16 which need not be the same size. One or more of the displays 16 may include a transparent interactive overlay to act as a touch screen, by which the user may use his or her finger as a pointing device. A pointing device 18, such as a stylus or light pen, is also shown which may select items from the screen or enter handwriting including signatures to an order to personalize objects. An alphanumeric keyboard 20 is affixed to the apparatus for data entry of alphanumeric and other information. A credit card reader 22 and currency receiver 24 provide alternative methods for users to pay for the services rendered. Those finished products produced by the apparatus itself for immediate delivery are dispensed via the out-tray 26. For products to be dispensed in the future, a second out-tray is provided. The second out-tray is not visible or accessible by a user of the device, but is a receptacle within the machine, accessible by key 28. Once each day, the finished items stored inside the machine are removed by a service person for shipping.

Figure 2:
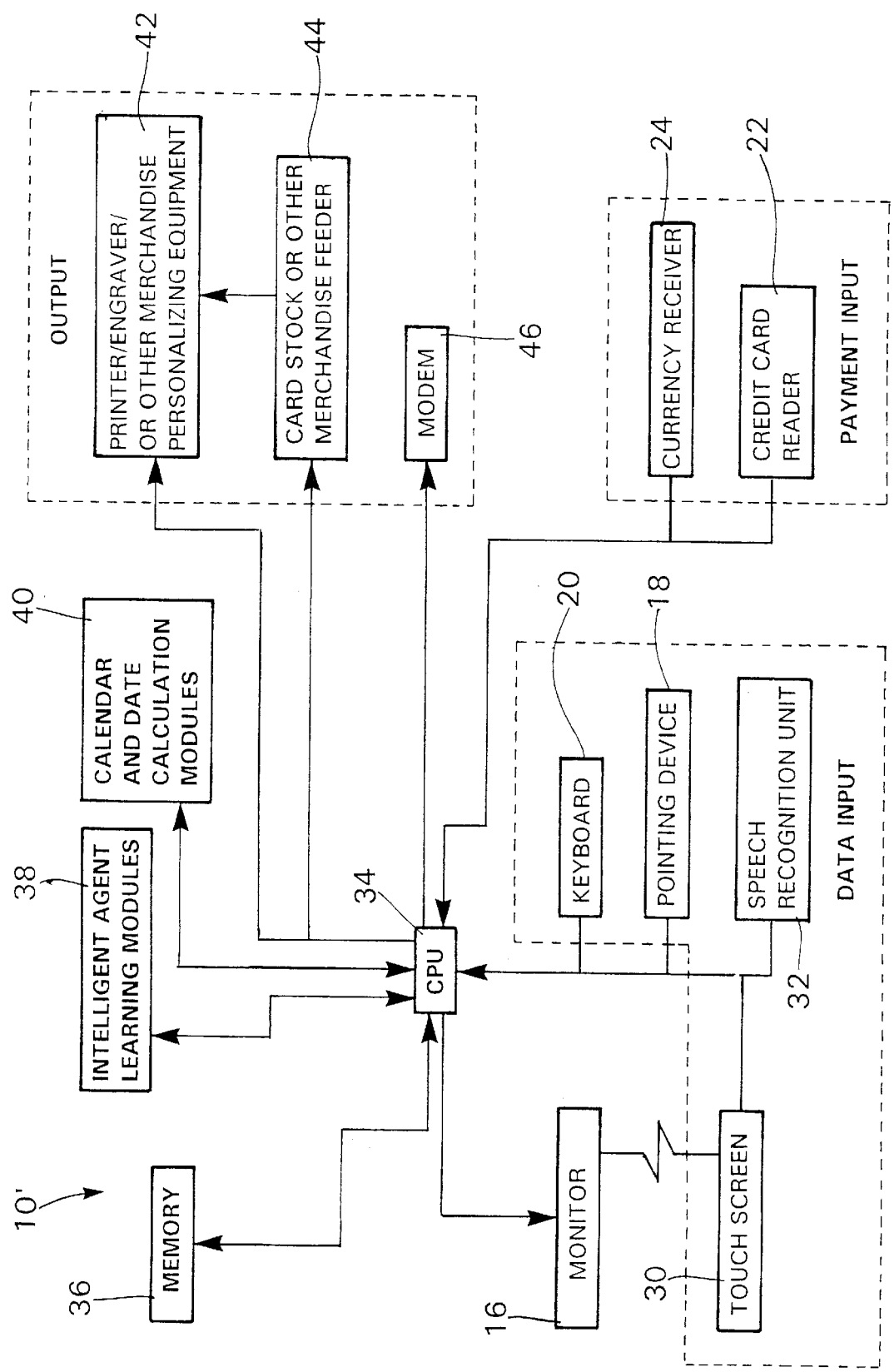
FIG. 2 is a schematic block diagram of the electronic apparatus of FIG. 1.

Referring to FIG. 2, a block schematic diagram of the apparatus 10 is illustrated. A programmable CPU 34 includes various kinds of memory 36 as well as intelligent agent learning modules 38 and a calendar and date calculation module 40 either of which may be hard coded into the CPU 34 or onto a separate connected microchip. The CPU 34 is connected to various data input devices, such as the keyboard 20, the pointing device 18, which may be a mouse, track ball or other digitizer, a speech recognition unit 32, or a touch screen 30. The CPU 34 is also connected to payment input devices such as the currency receiver 24 and the credit card reader 22. In addition, the CPU 34 is connected to the interactive screen or display screen 16 and to a modem 46. The modem is used to dial preprogrammed credit card verification facilities to confirm credit availability for a user who inserts a credit card into the card reader 22 which may or may not require input of a personal identification number or PIN via the keyboard 20. Alternatively, the user may enter his or her credit card number or credit account solely via the keyboard.

One or more output devices are connected to the CPU 34, including equipment 42, card stock or other merchandise feeder 44 and a modem 46. The feeder 44 stores and feeds merchandise such as card blanks, brass plate blank, telephone calling cards, etc. to a printer or other equipment 42 for personalizing and encoding the merchandise. The modem 46 is used to verify payment input such as credit cards and also to transmit electronic products or services, or order such services. It may be used to schedule pick up of items ordered in the past for creation "today", and which will be created and dispensed to an internal, locked out-tray 28.

Figure 3:
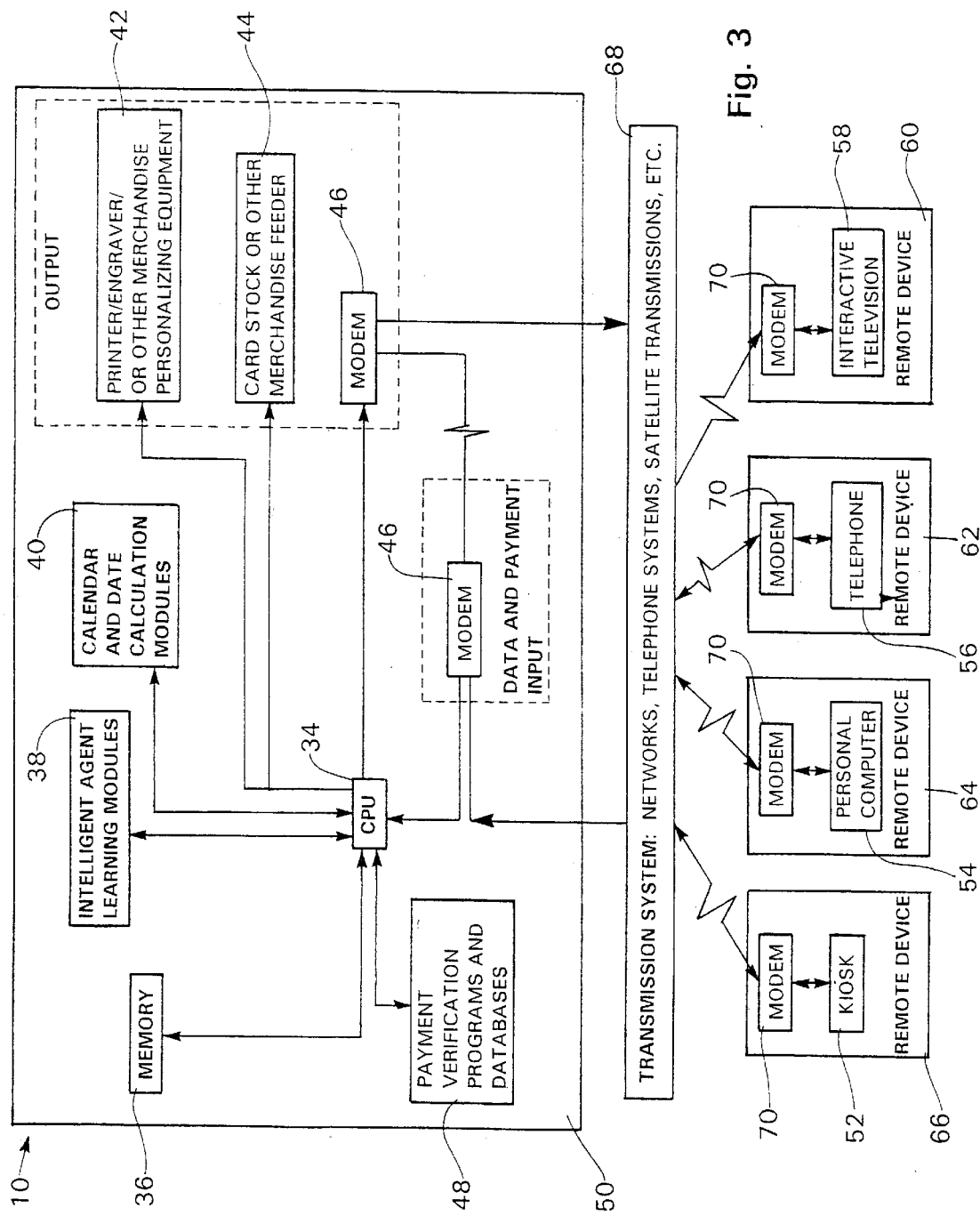
FIG. 3 is a schematic block diagram of an interconnected device for ordering, creating, and dispensing products and services, or carrying out delegated tasks, in the present or future, in accordance with another embodiment of the present invention.

FIG. 3 illustrates a block schematic diagram of an alternative embodiment of the invention in which an interconnected device 10' which includes the apparatus in FIG. 1 as a central hub 50 of the system or as one of the remote devices 60, 62, 64, or 66 connected thereto. The central hub 50 may act as either a mainframe with "dumb" input devices, or as a server with "smart" input devices in a client/server architecture. The central hub contains a CPU 34 with various kinds of memory 36 and includes intelligent agent learning modules 38 and a calendar and date calculation module 40 either of which may be hard coded into the CPU 34 or onto a separate connected microchip.

Input is provided via the various remote devices 60, 62, 64 or 66. Each remote device, whether a kiosk 52, personal computer 54, telephone 56, or interactive television 58, etc. includes or is attached to a modem 70 which digitizes and encodes the input data for transmission. The data is transmitted to the central hub or server 50 through a communication medium or transmission system 68 which includes networks (such as the Internet), telephone systems (public and/or private), radio wave, microwave, and satellite transmission systems, etc. At the central hub, a modem 46 reconstitutes the data into an electronic form usable by the CPU 34.

Payment for products and services is made by the user at the remote devices (60, 62, 64 and 66) using devices such as (but not limited to) credit card readers, currency receivers, credit card numbers entered via an alphanumeric keyboard, or voice which are not shown here. The information is transferred via modem 70 and the transmission system 68 through the central hub's modem 46 to the CPU 34. The CPU employs the modem 46 to dial preprogrammed credit card verification facilities to confirm credit availability, using payment verification programs and databases 48. (The central hub unit may have one or more modems to perform the input and output operations.)

Referring to FIG. 3, one or more output devices are connected to the CPU 34, including equipment 42, card stock or other merchandise feeder 44 and a modem 46. The feeder 44 stores and feeds merchandise such as card blanks, brass plate blanks, telephone calling cards, etc. to a printer or other equipment 42 for personalizing and encoding the merchandise. The modem 46 is used not only to verify payment input such as credit cards, but also to transmit electronic products or services, or order services. It may also be used to schedule pick up of items ordered in the past for creation "today" and to order products and services for shipping by third parties or remote storage facilities.

The remote devices (60, 62, 64 and 66) may have their own CPU's, memory facilities, intelligent agent learning modules and/or calendar and date calculation modules (not shown). In such circumstances, a remote device may transmit orders to the central hub only on the day of required dispensing or shipment.

AN ILLUSTRATION OF DATA INPUT AND LEARNING

The illustration is most easily understood in terms of an interactive device to which a user has frequent access, such as a desktop personal computer, dumb terminal connected to a network, or a kiosk in an office so that users will be repeat customers. The intelligent agent learning modules are useful only for repeat users. In a situation where repeat users are unlikely (perhaps a high volume shopping mall), the learning portion of the apparatus might be omitted. The unique ability of the invention to carry out tasks such as ordering products and services in the future is not impaired. The illustration is based upon the first example mentioned above: "Send flowers to Jim Smith and his wife on their anniversary."

Each repeat user is assigned a password or user identification number. The password or user identification number might be assigned by the system operator or administrator prior to a user's first use of the device. In an integrated computer system, a user might have the same password to access both the portions of the computer which embody this invention, and other portions of the computer which perform other tasks, such as word processing, or accounting. Alternatively, the device might assign a password to the user on his or her first use of the device or the device might let the user pick his or her own password that the device then remembers. If the user's access to the interactive device is via software installed on his or her own computer, the password might be assigned or chosen as a part of the setup and installation procedure of the software. Alternatively, the device might be programmed to accept a user ID issued by a third party (e.g., a credit card number, PIN number or social security number, etc.) as a valid ID. Rather than a password, a device might use other user identification procedures, such as retina scans, finger print scans or vocal identification, with requisite hardware incorporated into the device. If the user's access to the interactive device is via software installed on his or her own desktop terminal or computer, "logging on" to the computer or computer system using that user identification number and password, may also automatically "log" the user on to the present invention. In such a case, the enabling software resides as a memory resident program (like many scheduler and organizer programs) which is loaded when the machine is first booted up, but remains "dormant", with minimal use of machine resources until the user calls upon the present invention ("logs on") by clicking an icon, pressing a special key or combination of keys, or issuing a special voice command. In such an embodiment, the user, as part of the installation procedure, enters certain essential information for purchasing and delivering the items, such as his or her own name, return address, credit card number(s), and preferred closing ("Sincerely yours, Ben").

If repeat users are unlikely (as in a high volume shopping mall) and the learning portion of the device is omitted, "logging on" consists of pushing a Start button, or inserting currency, or a credit care. Alternatively, the payment operation (including entering the user's PIN number) might occur after the item to be sent had been selected and confirmed.

In some embodiments of the invention, including stand-alone kiosks, payment is made at the time the order is placed, by currency or credit (or debit) card. Some such embodiments permit the user to enter his or her credit account for later debiting when the order is executed. In other embodiments of the invention, with expected repeat users, the device learns the user's account number(s) (e.g., credit card, debit card, merchant account, etc.). Learning credit account numbers may take place at set up or first use. Alternatively, learning payment procedures may occur "prior" to a particular individuals use of the invention, as when a company account is assigned to a user by a system administrator along with the user's identification number and/or password. As with shipping addresses, the device can learn multiple account numbers and can permit the user to choose which one to use for this order. In the embodiment described in FIG. 5, which describes placing and executing an order, the payment method and account number are assumed to have been assigned or otherwise learned by the device, prior to the described order being entered. For this reason, the intelligent agent learning modules for entering, learning and choosing payment methods and accounts are not shown in the flow diagram of FIG. 5, although the payment learning modules are incorporated in the device and this invention contemplates alternative embodiments in which such intelligent agent learning modules learn payment procedures at other points in the flow diagram.

Figure 5:
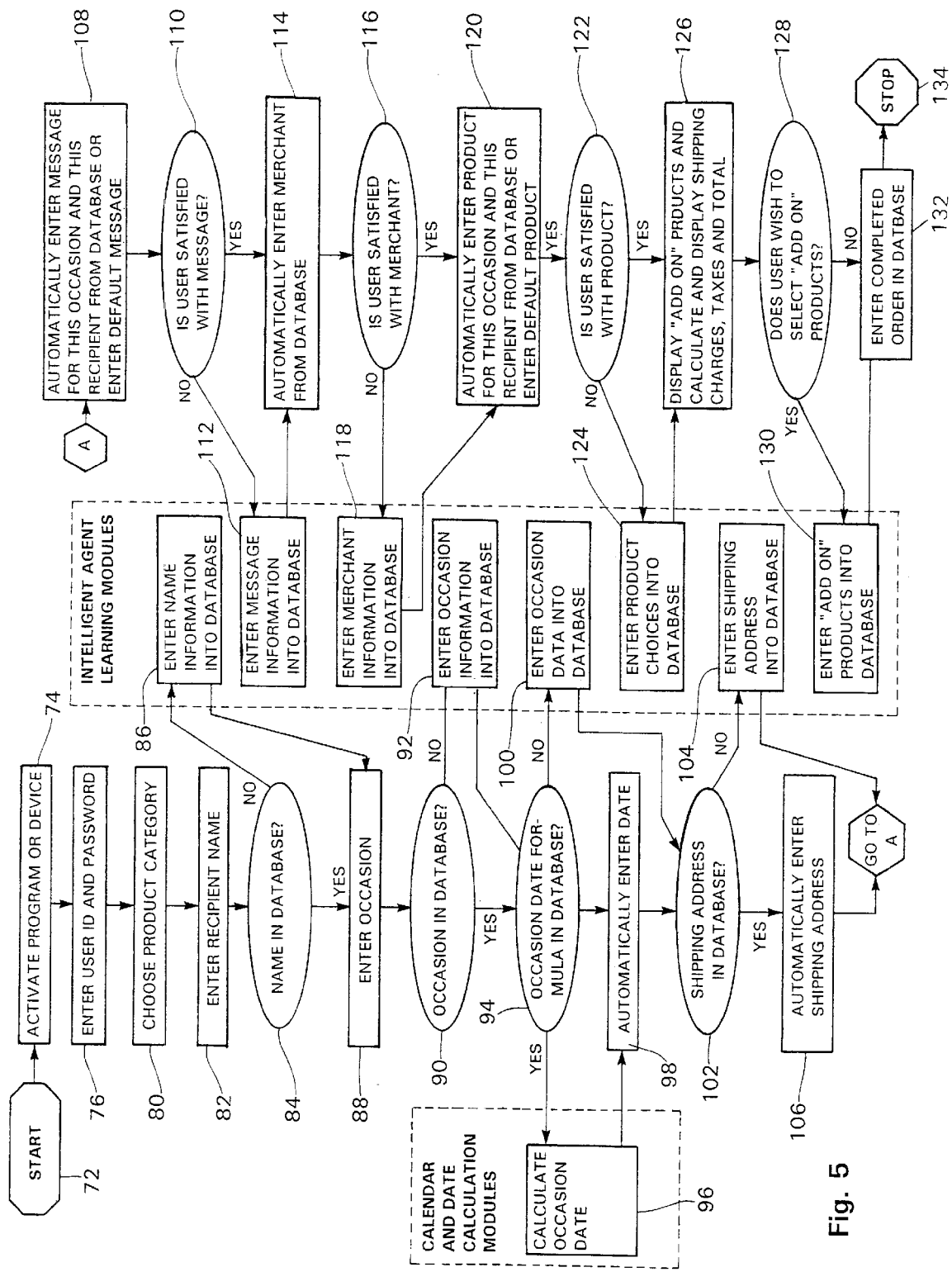
FIG. 5 is a flow diagram of a method used to access the product and service database and create a database of learned data and relationships in the process of ordering products and services or delegating tasks from a remote device of FIG. 3.

In any event, referring now to FIG. 5, the user first "logs on" to the device (step 72), activating the program or device (step 74). The user then enters his or her password and user identification number (step 76). (In alternative embodiments, the device initiates and completes some other procedure to identify the user.)

FIG. 4 shows the first screen that might appear to the user on the device's video screen or monitor (after user identification (step 76)). FIG. 5 shows a flow diagram of the method employed. Instead of flowers, the user may choose to send some other gift item, such as candy, greeting cards, fruit baskets or gourmet food. To do so, the user clicks (or tabs to and presses enter) on one of the shown tabs (step 80). The form then changes (although perhaps only slightly) to reflect the kind of gift being chosen. (For example, instead of "SEND!Flowers", the form may read "SEND!Candy".) Not shown are tabs which allow the user to choose which natural language will be employed on screen (e.g., English, as shown, Spanish, Japanese) With certain embodiments of the invention, choice of language is omitted or made at first installation, at initial set up, or at first use. Not shown are portions of the learning modules by which the device learns which language the user wishes to use. Choice of language affects a variety of default settings such as the message to be sent. To the extent that different languages represent different cultures, default choices of message content and product to be sent, etc. are affected. For multi-lingual users, the choice of language may depend upon factors such as the intended recipient, or the recipient's shipping address. Intelligent learning modules (not shown) learn these associations and automatically present (or change to) the appropriate screens and enter the appropriate default choices.

The user then enters the name of the recipient of the gift (step 82) (in the example, "Jim Smith and his wife"). The name can be typed in, or chosen by point and click from a drop-down combo list. If the name is already on the list, when the user types the first few letters of the name, the device's program automatically completes the name. If the name is not on the list the device asks if the entered name is a new name (step 84) (via pop up message or voice synthesized response). If the user answers that the entered name is a new name, he or she is requested to enter name information into the database (step 86), including the "title" (i.e. Mr., Mrs., etc.) for shipping label purposes. (In the example it would be "Dr. and Mrs.") The user is also asked to associate an existing "contact" name with the new name or enter a new "contact" or proper shipping label name. (In the example it would be "James D. Smith".) The user then enters the occasion for the gift (step 88) (e.g., a birthday or anniversary, or holiday such as Easter). The occasion can be typed in, or chosen by point and click from a drop-down combo list. If the occasion is already on the list, when the user types the first few letters of the occasion, the device's program automatically completes the occasion. If the occasion is not on the list, the device asks if the entered occasion is a new occasion (step 90) (via pop up message or voice synthesized response). The device then prompts the user to properly enter and categorize the occasion (step 92).

If the user had previously entered the recipient's name and occasion (or the occasion is a pre-programmed one such as Thanksgiving, Christmas or Rosh Hashanah) and the recipient's address, the user can skip down to the choice of flowers (or other gift) and the device enters the date and address automatically (steps 96, 98, 102 and 106).

Otherwise, the user must enter the date of the occasion which the device puts into its memory (step 100). The user may type the date (e.g., using numbers like "10/27/96" or using words such as "Oct. 27, 1996"), or may use words such as "Now", "Today", "Tomorrow", and "Next Week". In addition, the user may click on those words highlighted in the on-screen instructions.

If the posted date has just past (e.g., within the last week) the device queries the user as to whether the gift is to be sent the current year (albeit late) or whether the order is to be scheduled for next year.

If the user has previously entered one unique address for the "contact", the device enters it automatically (steps 102 and 106). Otherwise the user must enter an address (step 104). The address can be typed or (in the case of a contact with multiple addresses) clicked on from a drop-down combo list. Again, if the user begins typing the address, the device's program automatically completes the address after the first few keystrokes. In addition, the user can type in works such as "Home", "Residence", "Office", "Work", or "Business". The device recognizes such shorthand words and enters the appropriate address if one has been uniquely so categorized. As above, the user may instead, click on the words where highlighted in the on-screen instructions. As explained in the on-screen instructions, the user may also click on (or type in) the words "Last Address" or "Last Occasion Address" to access other addresses learned by the device.

The device can pull information such as addresses, spouse names, anniversaries and birthdays. from other databases that maintain an open format such as Microsoft's Schedule+ (a contact management and scheduling program). The device also automatically posts information to such databases, so that the information which the device obtains is accessible for other uses and programs. Alternatively, the device can incorporate its own contact management and scheduling programs with other appropriate forms for data entry and display.

In any event, once the first screen has been filled in with appropriate entries, and the user moves by tab or click to the "Type of Flowers" field to make a gift choice, portions of the screen change as shown on FIG. 6.

The device generates and displays a proposed message to be included with the gift which is appropriate for the occasion (step 108). Salutations, Message, and Closing can be changed (steps 110 and 112) and the device remembers the changed salutations, changed message and/or changed closing (collectively, the "new message") as associated with the current occasion and contact. A future gift to the same contact for the same occasion (i.e. the next year) generates the new message as the proposed message (step 108).

The proposed merchant who will ship the gift is displayed (step 114). Choices may be available from a drop-down combo list (steps 116 and 118). The default choice may be generated by the state, city or zip code of the intended recipient.

The user does not have to alter the message or merchant information if he or she doesn't wish.

A default type of flower is shown (step 120). The type of flower will be the same type as used previously for the entered contact for the same occasion. If such a gift has not been previously given to the entered contact, the default will be the type of gift the user usually gives on such an occasion (derived by searching memory). If such a gift has not been given to anyone for the entered occasion, the default will be an appropriate gift of the average dollar amount that the user usually spends. The device's choice of a default type of flower is made at times, and in part, by intelligent agents and expert systems incorporated in the intelligent agent learning modules. Other choices that the device makes automatically or by default (such as but not limited to merchant, default message, "add on" products) are also made at times, and in part, by other intelligent agents or expert systems incorporated in other learning modules. In any event, the user may choose a different gift from the drop-down combo list (steps 122 and 124) (which may be filled by different items depending on the occasion or merchant chosen).

When the gift choice is made, or confirmed, a picture of the gift is displayed, along with its price. Shipping fees and tax, as well as the total bill, are calculated and displayed (step 126). See also FIG. 7.

The user is also offered "add on" items to choose from. As a user clicks on an item, the bill is automatically adjusted (steps 128 and 130).

The user can then cancel the order or approve or OK the order. If the user clicks OK (or tabs to that button and presses Enter), the order is entered in memory (step 132). The program also calculates what date the order must be shipped and enters that date also in memory. The calculated shipping date may depend on whether the delivery address is a home or work one (no weekend deliveries), whether the occasion occurs at a time of year with shipping constraints (e.g., Christmas in general, or Valentine's Day for flowers) or if other parameters exist. At this point in the program, the program may also ask the user if the current order is a one time order, or if the user wants the current order repeated every year.

If the user has previously sent anything to the contact (or entered the contact into a contact manager with shared files), and has a standard choice of anniversary bouquet, he or she need only enter name and occasion, tab through "Type of Flowers" and click OK. If a voice recognition module is incorporated in the device, the user need only speak: "SEND flowers TO Jim Smith and his wife ON THEIR anniversary." (The prepositions act as delimiters for field entry.) In some variations, a synthesized voice repeats the entry along with the device generated (and retrieved) data on date, address, message, and flower type. The synthesized voice then asks the user to confirm the order by saying "OK."

In some embodiments, clicking OK closes the ordering portion of the program (step 134). In other embodiments, the program enters a "dormant" phase like a memory resident desktop organizer, appointment scheduler or screen saver, waiting to "awake" when an new order is entered. In other embodiments, such as a stand-alone kiosk, clicking OK returns the program to an opening screen (step 134), inviting prospective users to log on (step 72).

AN ILLUSTRATION OF AUTOMATED ORDER SHIPPING AND DISPENSING AT A FUTURE TIME.

Figure 8:
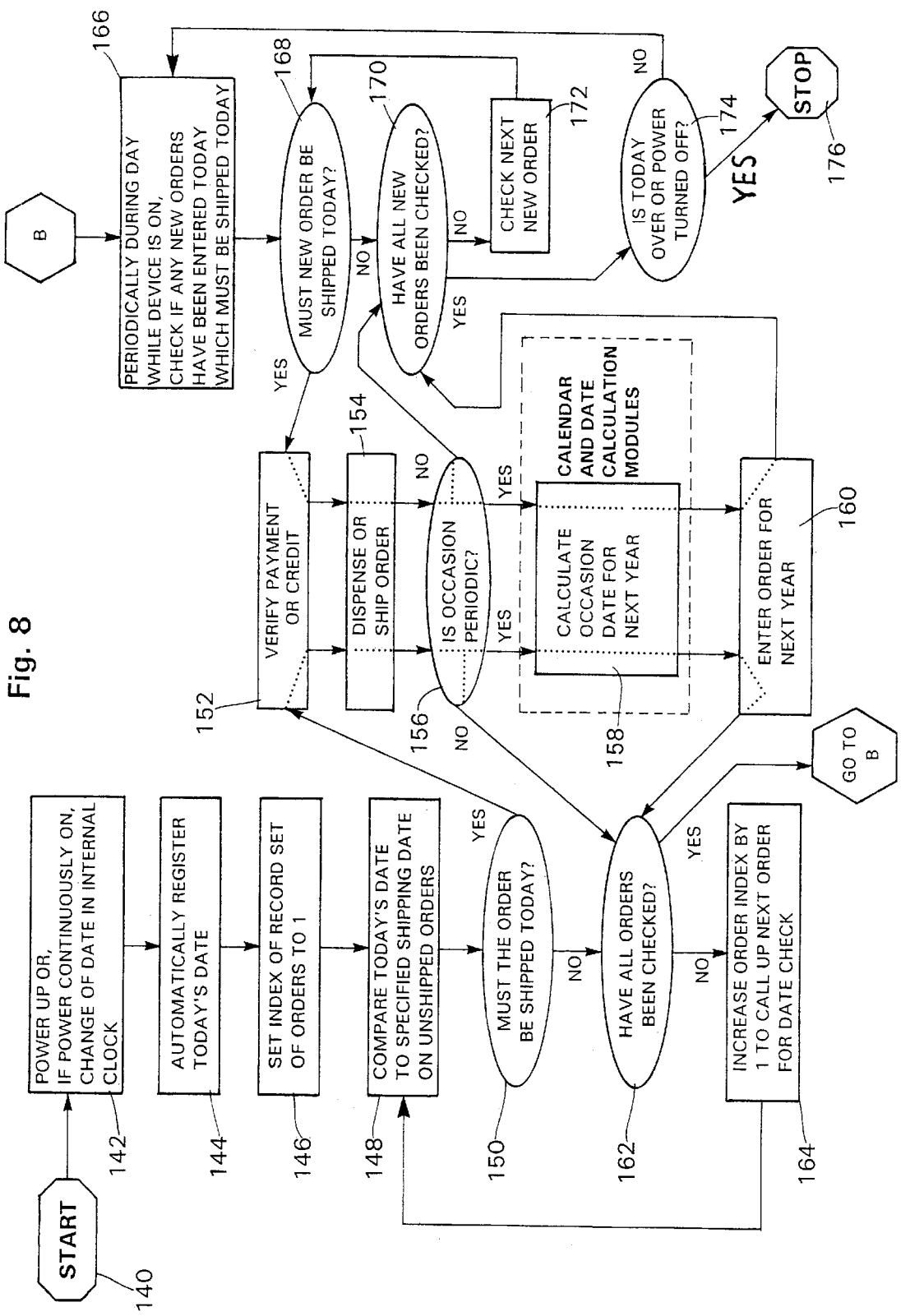
FIG. 8 is a flow diagram of a method for executing delegated tasks (including shipping or dispensing the ordered products and services) at the designated times.

Referring to FIG. 8, the first thing done every day ( steps 140 and 142), is that the central processing unit compares the current date on its internal clock with the list of dates on which orders must be shipped, processed or dispensed (steps 144, 146 and 148). The central processing unit retrieves the list of those to be dealt with on the current day and processes them (steps 148, 150, 152, 154, 156, 158, 160, 162 and 164). For each item the central processing unit checks to see if the order must be shipped on the current day (step 150) and verifies the payment procedure prior to dispensing or shipping (step 152) (prepaid funds available or verification of credit card number and account viability). The central processing unit then executes the order (step 154) whether by creating and dispensing the item for collection and shipping, by transmitting an order to a remote location for dispensing the item for collection and shipping, by transmitting an order to a third party supplier for shipping the item, or otherwise by dispensing and transmitting the item (be it physical or electronic) as described above.

The transmission of orders is accomplished via various output devices and means using analog and/or digital signals and modems to convert between analog and digital, where appropriate. Transmission occurs over wires (such as coaxial cable, telephone wires and fiber optic cables) of various private or public systems including telephone systems and cable TV system. Alternatively, transmission occurs using electromagnetic waves (such as but not limited to microwaves and radio waves) through various media (such as air) or no media (such as the vacuum of space) of various private or public systems including but not limited to cellular phones, direct satellite transmissions, interactive broadcast television. In addition, the transmission occurs within private or public networks, and/or networks of networks, including but not limited to intranets and the Internet. By way of example, in one embodiment, the transmission of orders is a fax transmission to a third party merchandise supplier over public telephone lines. In another embodiment, the transmission of orders is by direct wireless computer-to-computer data transmission over the cellular phone network. Various other methods of transmission have been described above.

If the initial data entry device is a desktop PC, terminal, or telephone (or other entry device intended to be used by one individual), the user is given a list of items to be shipped on the current day for confirmation. Alternatively, the items could be shipped with confirmation later sent to the user that the items had in fact been shipped as previously instructed.

After shipping or dispensing an order, the device checks to see if the order is for a reoccurring occasion such as a birthday or holiday (step 156). If the occasion is reoccurring, then the occasion date for the next year is calculated (step 158) and the order is reentered for the following year (step 160). (In a stand-alone device, the order would not be reentered unless pre-paid or credit pre-authorized.)

As new entries are made during the day they are checked to ascertain if they must be shipped immediately (step 168) and if so, then processed (steps 152 and 154). Alternatively, the device examines the database periodically, at scheduled times during the day, for new orders that must be shipped immediately (step 166). If it finds any such orders (step 168), it verifies the payment (step 152) (e.g., prepaid funds on account or valid pre-entered credit card number) as part of a first subtask. It then ships or dispenses the orders (step 154) as part of a second subtask. The device checks to see if the orders are for a recurring occasion (step 156), and if so, calculates the next occurrence (step 158) and enters an appropriate order (step 160). It then continues the checking process ( steps 170 and 172). As the device is shut down each day, or the user otherwise logs off, and power is turned off, the program ends (steps 174 and 176). If instead, the device remains on continuously, 24 hours a day, at the conclusion of each day (step 174), as it resets its internal time clock, it resets the program to the beginning (steps 140 and 142).

The device described above builds and then accesses a database consisting of a number of data tables. The database can be constructed in a variety of ways, but an illustrative list of key tables includes: (a) a contacts table (or set of linked and related tables) that acts as a contact manager containing names, addresses, telephone numbers, and other personal and business information; (b) an occasions table (or set of linked and related tables) that contains general information on holidays, celebrations and other occasions, including means of calculating the date of holidays based on non-Gregorian calendars, and default holiday messages; (c) a products table (or set of linked and related tables) that contains the products or services which can be ordered and information concerning them including prices and bit-mapped product images (or paths to such images) where appropriate, suppliers and the means to electronically send orders to them, and; (d) an orders table (or set of linked and related tables) that records items to be sent, where, to whom, functioning as the "do it" list for the program as well as history of past transactions. Other embodiments of the invention use tables appropriate to the tasks being delegated which may be similar or different from the above illustration.

OCCASION DATE CALCULATIONS FOR SELECTED HOLIDAYS AND NON-GREGORIAN CALENDARS

The step of calculating occasion dates (step 96 in FIG. 5) may require additional calculations, such as when the occasion date depends upon periodicities of non-Gregorian calendars. The following description is provided to assist a user of the apparatus 10 in implementing the calendar and date calculation modules to perform such calculations.

Calendars are based to a large extent upon the major natural cycles; the rotation of the earth (the 24 hour day), the revolution of the moon around the earth (the lunar month) and the revolution of the earth around the sun (the solar year). The importance of these cycles is that many events in nature are determined by them, and that these events of nature have had implications for both primitive and advanced economies. For example, the growing seasons (spring, summer, fall, winter) are determined by the position of the earth with respect to the sun whereas the tides are determined primarily with respect to the position of the earth with respect to the moon (and to a lesser extent the position of the earth with respect to the sun). A major aim of all calendars has been to accurately describe these natural cycles and hence make these natural events and their economic consequences more predictable. A major task of all calendars has been to reconcile the different periodicities of these cycles.

For example, a solar year is approximately 365 days, but is not exactly 365 days. The aim of many calendars has been to ensure that the seasons (as represented by a calendar's date for the solstices and equinoxes) remain the "same" every year. To make the calendar more accurate, the Julian calendar (the official calendar adopted by the Julius Caesar and the Roman Empire) added an extra day in every year divisible by four (i.e., a "leap year", every four years). For even greater accuracy, the Gregorian calendar (used as the official calendar of most Western nations including the United States) eliminated leap year in those "century" years which are not divisible by 4 (e.g., there was no leap year in the year 1900 AD because 19 is not divisible by 4).

Another example, the lunar month is approximately 30 days. In fact, it is between 29 and 30 days. But a "year" of 12 lunar months is only a fraction of a day more than 254 days. The Gregorian calendar retains its accuracy with respect to the sun by allowing its 12 months to exceed 30 days and to depart from the lunar cycle. On the other hand, the Islamic calendar is based solely on the lunar month with a "year" consisting of 12 lunar months, and regularly scheduled "leap years" with an extra day. For the Islamic calendar the start of every year will have the same relationship to the lunar cycle, but not the same relationship to the (solar) seasons of the year. The Hebrew calendar also contains 12 lunar months, but seven times every 19 years adds an extra 29 day month so that the calendar stays approximately in line with the seasons. The Chinese calendar is also based upon a lunar month and has another (different yet similar) method of reconciling the lunar and solar cycles. Other calendars have different, but well defined, methodologies for achieving these ends.

In addition, many calendar systems divide the passage of time into 7 day weeks, with one particular day having special religious significance as a day of rest (e.g., Friday for Moslems, Saturday for Jews, Sunday for Christians). In some religions, certain religious holidays must occur on particular days of the week.

Not only do different religions have different holidays, but different religions may base their holidays on different calendars. Some religions use different periodicities for different holidays. For example, those Christian holidays termed "immovable feasts" (e.g., Christmas) have been based on a solar cycle such as the Gregorian calendar. Other Christian holidays termed "movable feasts" (e.g., Easter, Lent) are based upon multiple cycles Easter being essentially the first Sunday after the first new moon after the spring equinox with some other adjustments).

In any event, these natural cycles and subsequent calendars, as well as related religious holiday schedules, are mathematically well defined, although not easily accessible to the lay-person. In addition, to one knowledgeable in the art, the calculations that must be performed to find the date in one calendar system for another event or holiday defined in another calendar system or by other such cycles are straightforward, although sometimes tedious.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An intelligent agent for executing tasks, at least some of the tasks being date sensitive, and at least some of the tasks being physical commercial transactions which require payment of funds for completion of the task, the intelligent agent comprising:

(a) at least one data input device for entering tasks to be executed, at least one of the tasks including a first subtask for executing a physical commercial transaction, and a second subtask for executing a payment of funds related to the cost of the physical commercial transaction, wherein at least some of the first and second subtasks are indicated as being executed at a future date;

(b) at least one intelligent agent learning module for storing information necessary to execute the tasks including information associated with previously executed tasks;

(c) at least one calendar and date calculation module for providing date information necessary to execute the date sensitive tasks;

(d) a computer connected to the at least one data input device, the at least one calendar and date calculation module, and the at least one learning module, the computer receiving the entered tasks, calendar and date information, and learning module information relevant to the tasks, processing the information, and generating instructions for executing the tasks, the computer using at least some of the previously stored information to execute at least some currently requested tasks, the computer including a future task instruction generator for allowing entered tasks, including physical commercial transaction tasks and payment tasks related to the physical commercial transaction, to be executed at a future date; and (e) at least one output device connected to the computer for execution of the tasks on the appropriate date, the at least one output device including a first output device to perform the physical commercial transaction on the appropriate date, and a second output device to execute the payment of funds on the appropriate date.

2. An intelligent agent according to claim 1 wherein the instructions for executing the date sensitive tasks include instructions to execute at least one of the date sensitive tasks on a periodic basis.

3. An intelligent agent according to claim 2 wherein at least some of the date sensitive tasks are based upon a non-Gregorian calendar, and the calendar and date calculation module is programmed to determine Gregorian calendar dates for executing the task based upon the non-Gregorian calendar or based at least in part on a non-Gregorian periodicity or periodicities.

4. An intelligent agent according to claim 2 wherein the periodicities are non-conventional, and the calendar and date calculation module is programmed to determine selected non-conventional periodicities.

5. An intelligent agent according to claim 1 wherein at least some of the date sensitive tasks are based upon a Gregorian calendar.

6. An intelligent agent according to claim 1 wherein the first and second subtask are executed at the same time.

7. An intelligent agent according to claim 1 wherein the at least one data input device is a device remote from the computer, and the intelligent agent further comprises:

(f) a communication medium for providing bidirectional communication between the at least one data input device and the computer.

8. An intelligent agent according to claim 1 wherein at least one data input device is a device which recognizes natural language commands.

9. An intelligent agent according to claim 1 wherein at least one output device is merchandise personalizing equipment.

10. An intelligent agent according to claim 1 wherein the at least one data input device includes a user interface for entering the tasks directly by a user.

11. An intelligent agent according to claim 1 wherein the at least one data input device includes an automated entry device for automatically receiving data, wherein tasks are executed based upon contents of the automatically received data.

12. An intelligent agent according to claim 1 wherein at least one of the elements (a)–(e) are located physically remote from another one of the elements.

13. An intelligent agent according to claim 1 wherein all of the elements (a)–(e) are located physically at a single location.

14. An intelligent agent according to claim 1 further comprising:

(f) a device for querying a user, wherein the tasks to be executed are entered into the at least one data input device based upon the user's response to the query.

15. A method of interconnecting a plurality of devices to form an intelligent agent for executing tasks, the devices including (i) at least one data input device, (ii) at least one intelligent agent learning module for storing information necessary to execute the tasks including information associated with previously executed tasks, (iii) at least one calendar and date calculation module for providing date information necessary to execute date sensitive tasks, (iv) a computer connected to the at least one data input device, the at least one calendar and date calculation module, and the at least one learning module, the computer including a future task instruction generator for allowing entered tasks, including physical commercial transaction tasks and payment tasks related to the physical commercial transaction, to be executed at a future date and (v) at least one output device connected to the computer including a first output device to perform the physical commercial transaction, and a second output device to execute payment of funds for the physical commercial transaction, the method comprising the steps of:

(a) entering tasks to be executed into the at least one data input device, at least some of the entered tasks being date sensitive, at least one of the tasks including a first subtask for executing a physical commercial transaction, and a second subtask for executing a payment of funds related to the cost of the physical commercial transaction, wherein at least some of the first and second subtasks are indicated as being executed at a future date;

(b) receiving the entered tasks, calendar and date information, and the learning module information relevant to the tasks by the computer;

(c) processing the information by the computer to generate instructions for executing the tasks; and (d) executing the tasks with the at least one output device on the appropriate date, the computer using at least some of the previously stored information to execute at least some currently requested tasks, the task executing step including generating future task instructions to execute the first and second subtasks.

16. A method according to claim 15 wherein at least one of the plurality of devices is physically remote from the other devices and is interconnected to the other devices via a remote communication medium, steps (a)–(d) being performed by using the remote communication medium to communicate tasks to be executed, information relevant to the tasks, or instructions for executing the tasks between the at least one remote device and the other devices.

17. A method according to claim 15 wherein devices (i)–(v) are physically remote from each other and are interconnected via remote communication media, steps (a)–(d) being performed by using the remote communication media to communicate tasks to be executed, information relevant to the tasks, and instructions for executing the tasks between respective remote devices.

18. A method according to claim 15 wherein step (d) further includes the steps of:

(i) using the first output device to perform the physical commercial transaction at a first predetermined future time, and (ii) using the second output device to execute the payment of funds at a second predetermined future time.

19. A method according to claim 15 wherein the first and second subtasks are executed at the same time.

20. A method according to claim 1 wherein the at least one data input device includes an automated entry device for automatically receiving data, and step (a) includes automatically entering tasks to be executed based upon contents of the automatically received data.

* * * * *

UNITED STATES PATENT AND TRADEMARK OFFICE
CERTIFICATE OF CORRECTION

PATENT NO. : 5,983,200
DATED : November 9, 1999
INVENTOR(S) : Benjamin Slotznick It is certified that error appears in the above-identified patent and that said Letters Patent is hereby corrected as shown below:

<u>Column 26,</u>
Line 30, change "1" to -- 15 --.

Signed and Sealed this

Seventh Day of January, 2003

JAMES E. ROGAN
*Director of the United States Patent and Trademark Office*